March 24, 1959     H. N. FAIRBANKS     2,878,952
HAND CUTTER

Filed Feb. 14, 1956     2 Sheets-Sheet 1

Henry N. Fairbanks
INVENTOR.

BY
ATTORNEYS

March 24, 1959　　　H. N. FAIRBANKS　　　2,878,952
HAND CUTTER

Filed Feb. 14, 1956　　　　　　　　　　　　2 Sheets-Sheet 2

Henry N. Fairbanks
INVENTOR.

BY Daniel I. Mayne
J. Griffin Little
ATTORNEYS

United States Patent Office 2,878,952
Patented Mar. 24, 1959

2,878,952

HAND CUTTER

Henry N. Fairbanks, Rochester, N.Y., assignor to Eastman Kodak Company, Rochester, N.Y., a corporation of New Jersey Application February 14, 1956, Serial No. 565,504

5 Claims. (Cl. 216—29)

The present invention relates to a cutting device, and more particularly to a device for cutting or separating individual image areas or transparencies from a film strip and positioning the severed areas or individual mounts.

As is well known, the image areas of a colored film are arranged in connected relation in a film strip. These separate image areas are then individually severed from the strip and placed in cardboard mounts of well known construction.

The present invention relates to a simple device by which said transparencies are cut from a strip and placed in a mount which is positioned accurately to receive the severed transparencies. In addition, means is provided to frame or position the film strip so that the frameline between the transparencies is positioned in alignment with the severing means so that a complete transparency is severed upon each actuation of the knife or severing means, the advantages of which are deemed apparent. Also, the device is provided with a viewing window at the mount receiving station so that the severed transparency area may be positioned in proper and accurate relation with the mount.

The invention has as its principal object, the provision of a new, simple and improved cutting and mounting device for transparencies.

Still another object of the invention is the provision of an improved hand operator mounting means.

Yet another object of the invention is the provision of means for accurately positioning a mount to receive the severed transparency.

And still another object of the invention is the provision of means to position the transparency to be severed in accurate relation with the cutting means.

A further object of the invention is the provision of a transparency cutting and mounting means which is simple in design, comprises few parts of rugged construction, easy to operate, accurate, and highly effective in use.

To these and other ends the inventive idea resides in certain improvements and combinations of parts, all as will be hereinafter more fully described, the novel features being pointed out in the claims at the end of the specification.

In the drawings.

Similar reference numerals throughout the various views indicate the same parts.

Figure 3:
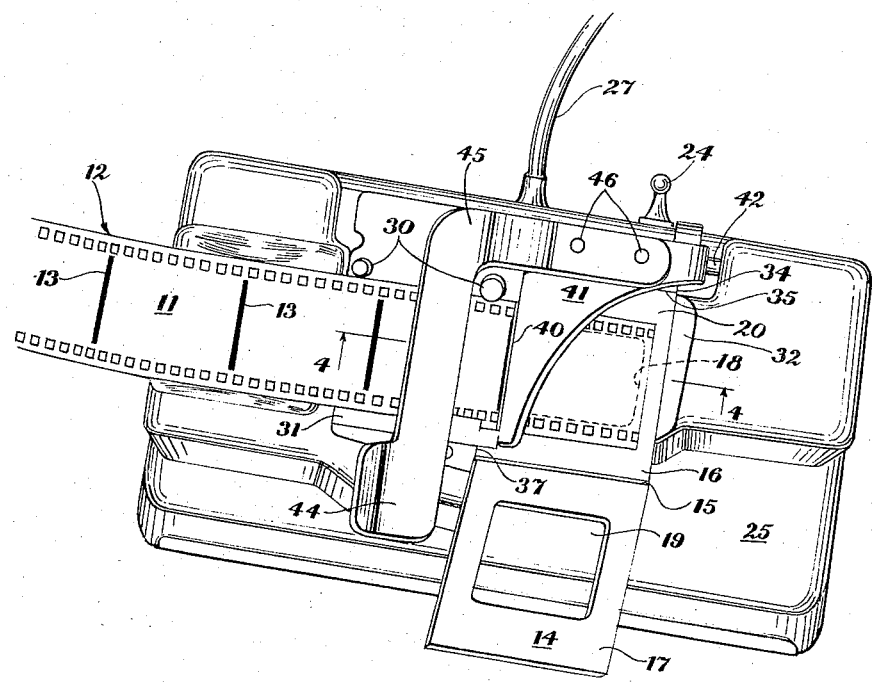
Fig. 3 is a view similar to Figs. 1 and 2 but showing both the film and mount in position and the film ready to be cut and positioned on the mount.

The various image areas 11 of a colored film are arranged along a film strip 12, and the individual image areas are separated by frame lines 13, as shown in Fig. 3, and well known in the art. The various image areas or transparencies are separated from the strip 12 by severing the latter along a frameline 13, as is well known. These separate or severed transparencies are then positioned in a mount, broadly designated by the numeral 14, formed from a piece of cardboard scored along the central line 15 to form a pair of flaps 16 and 17 which are provided with apertures 18 and 19 adapted to register when the flaps 16 and 17 are folded along the line 15, all of which is well known to those familiar with such transparency mounts. When the flaps are folded, the transparency 11 is sandwiched between the flaps 16 and 17. One of the flaps, say flap 16, has positioned thereon an adhesively coated hollow rectangular insert 20 which surrounds the aperture 18 in flap 16 and is provided with a central aperture of such size as to receive and form a seat for the severed transparency 11, all of which is well known in the art. The mount itself with the insert 20 forms no part of the present invention.

Figure 4:
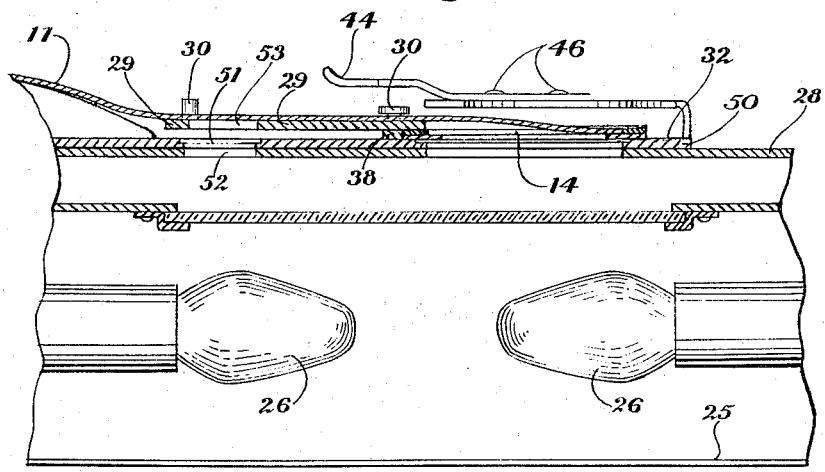
Fig. 4 is a vertical sectional view taken substantially on line 4—4, Fig. 3, showing the relation of the film and mount guides and the mounting station.

The present invention provided a device for severing individual transparencies or image areas 11 from the film strip, and positioning each severed transparency in the mount which is positioned as shown in Fig. 3, and later to be more fully described. The device of the present invention comprises a hollow base member 25 in which is positioned lamps 26 connected by a cord 27 to a suitable outlet, not shown, a switch 24 is connected into the circuit of the lamps 26 to control the latter. The top surface 28 of the base 25 is provided with a film guide 29 along which the film strip 11 is moved to the right. Upstanding pins 30 and plate 31 are positioned on surface 28 and are spaced apart laterally a distance equal to the width of the film to position the latter on guide 29. Thus, the film strip is guided during its rightward travel along the guide 29. The top 28 of the base 25 is also provided with a mounting station 32 positioned slightly below the plane of the film guide 29, as best shown in Fig. 4. This mounting station is provided with a viewing window 33 which is illuminated by lamps 26. This viewing station is adapted to receive the upper flap 16 of the mount with the aperture 18 of the flap in registry with the viewing window 33.

In order to position the mount 14 accurately on the station 32, the latter is provided with a strip 34 with which the upper edge 35 of the flap 16 engages to position the flap 16 and hence the mount laterally on the station 32. The right edge 36 of the film guide 29 overlies the station 32 to form a slot adapted to receive the left side edge 37 of the mount to maintain the latter in proper relation with station 32. The edge 37 engages a shoulder 38 which cooperated with a strip 34 to orient or position the mount on the station 32 and with the mount aperture 18 in registry with the window 33, as shown in Fig. 3. The right edge 36 of the guide 29 forms a stationary cutting edge or knife.

Figure 1:
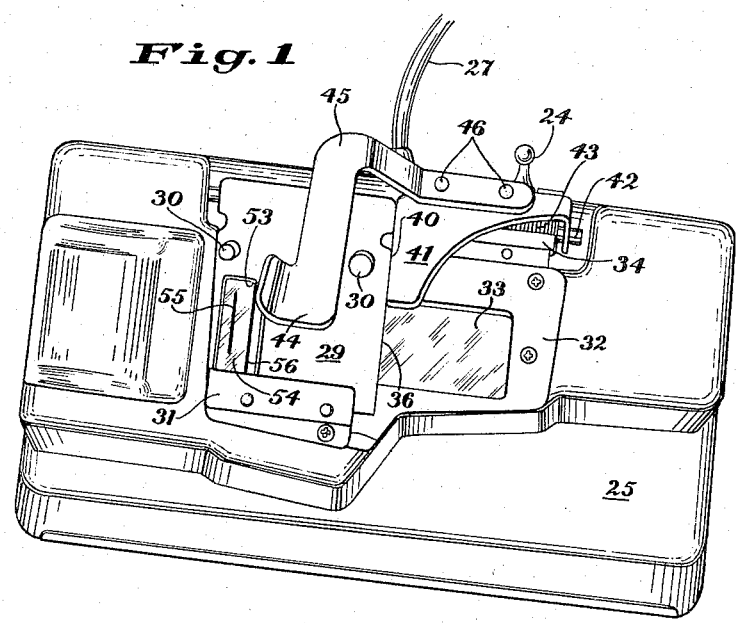
Fig. 1 is a perspective view of the cutting and mounting device of the present invention, showing the relation of the parts.
Figure 2:
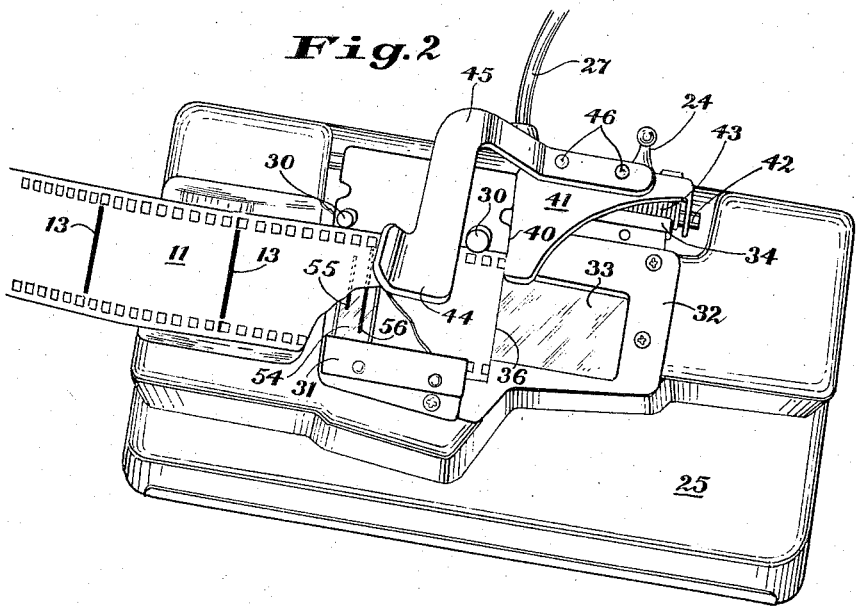
Fig. 2 is a view similar to Fig. 1 but showing the film in place on the film guide and in alignment with the knife or severing means.

After the film strip 12 has been placed on the guide 29, in the manner shown in Fig. 2, the flap 16 of the mount is slid under the overhanging edge 36 of the guide 29 and in contact with the shoulder 38. The mount is then slid inward or upward, as viewed in Fig. 3, until the upper edge 35 engages and is stopped by the strip 34. The mount is then accurately positioned on the station 32 with the aperture 18 in registry with window 33. The film strip 12 is then slid to the right until the frameline 13 is brought into alignment with the stationary knife member 36. The parts are then in the position shown in Fig. 3. The lower right hand corner of the transparency, Fig. 3, is then held down against the mount by the fore finger of the right hand of the operator. The movable knife 40 is then lowered into cooperating relation with the stationary knife 36 to sever the transparency or image area along the frameline 13, as is deemed apparent from an inspection of Fig. 3. The movable knife 40 is formed on the left edge of the plate 41 of the shape best shown in Fig. 3, pivoted on shaft 42 secured to the surface 28 of the base 25. A coil spring 43 wrapped around shaft or pivot 42 serves to return the plate 41 and knife 40 to their upper or inoperative position upon release of the knife. The knife is lowered by engaging a fingerpiece 44 with the left hand while the fore finger of the right hand holds the lower right corner of the transparency in position on the mount. The fingerpiece is formed on one end of an L-shaped arm 45, the other end of which is connected to plate 41 by rivets 46, or other suitable fastening means. Thus, the film is positioned and moved to mounting position, and the transparency positioned relative to the mount and then severed from the strip. The mount with its positioned transparency is then removed from the device and the mount is folded and then placed in a suitable heating press, not shown, to adhere to the adhesive coated insert 20, in a manner well known in the art, to form the complete mount in which the transparency is sandwiched between the flaps 16 and 17.

As mentioned above, the film strip may be positioned relative to the mount by bringing a frameline 13 into registry with the stationary knife 36. However, when the mount 14 is in position at the mounting station 32, it is sometimes difficult to determine the position of a frameline.

In order to overcome this difficulty, the present invention provides an additional or second framing means.

In the present embodiment the mounting station is on a plate 50 which extends to the left and under the film guide 29, as best shown in Fig. 4. This plate 50 is formed with an aperture 51 which registers with an opening 52 in the top 28 and an opening 53 in the film guide 29, as clearly illustrated in Fig. 4. The opening 52 is covered with a clear glass plate and is illuminated by one of the lamps in the base 25. Also, the glass plate has formed thereon a pair of lines 55—56, the former being the shorter, and is used in connection with 828 film, while the longer one is used in connection with 35 mm. film. Thus, when a film strip is placed on the film guide 29, a frameline 13 between adjacent image areas is brought into registry with the proper lines 55—56, depending upon the type of film being used. When so registered with one of the marks 55—56 a frameline will also be in registry with knife 36, the advantages of which are deemed apparent. Thus, the present invention provides an illuminating auxiliary framing means which insures proper positioning of the image area of the transparency with the cutting or severing means.

The present invention thus provides a cutting and mounting device for transparencies by which the film strip and the mount are both accurately positioned relative to each other so that when an image area is cut from the strip, it will be positioned in proper relation on the mount.

The device is simple in structure, rugged, easy to operate and highly effective in use.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. In a device for cutting and mounting separate transparencies arranged in connected relation in a strip, the combination with a base, of a film guide on said base along which a film strip is moved, means to position a mount on said base in alignment with said guide to receive a transparency, means on said base to sever separately said transparencies from said strip for deposition on a mount, and framing means on said guide spaced from said mount positioning means to position said strip in proper framed relation with said severing means.

2. In a device for cutting and mounting separate transparencies arranged in connected relation in a strip, the combination with a base, of a film guide on said base along which a film strip is moved, means to position a mount on said base in alignment with said guide to receive a transparency, means on said base to sever separately said transparencies from said strip for deposition on a mount, a window on said guide spaced from said mount positioning means and over which said film strip is moved, and means at said window to frame a transparency to position said strip in proper relation with said severing means to sever a transparency from said strip.

3. In a device for cutting and mounting separate transparencies arranged in connected relation in a strip, the combination with a base, of a film guide on said base along which a film strip is moved, a mounting station on said base in alignment with said guide, means to position a mount on said base at said station to receive a transparency, means on said base to sever a transparency from said strip for reception of said mount, and framing means on said guide spaced from said severing means to position a transparency in proper relation to said severing means so that a complete transparency will be severed from said strip for deposition on said mount at said station.

4. In a device for cutting and mounting separate transparencies arranged in connected relation in a strip, the combination with a base, of a film guide on said base along which a film strip is moved, a mounting station on said base in alignment with said guide, a viewing window associated with said station, means to position a mount on said base at said station and in registry with said window and in position to receive a transparency, means on said base for severing a transparency from said strip for reception by said mount, a film registering window on said guide spaced from said severing means a distance of one transparency, and framing means for said strip at said last window to position a frameline of a transparency in alignment with said severing means so that a complete transparency is severed and deposited on said mount.

5. In a device for cutting and mounting separate transparencies arranged in connected relation in a strip, the transparencies being separated by frame lines, the combination with a base, of a film guide on said base along which a film strip is moved, means to position a mount on said base in alignment with said guide to receive a transparency, means on said base to sever said transparencies at said frame lines to separate said transparencies from said strip, means forming a framing window spaced from said severing means, and a registering line in said window and spaced from said severing means the distance between successive frame lines of one transparency so that when a frame line is moved into registry with said registering line the preceding frame line is in registry with said severing means to insure the severance of a complete transparency.

References Cited in the file of this patent

UNITED STATES PATENTS

| 1,771,394 | Antonuk | July 29, 1930 |
| 2,493,159 | Morrison | June 3, 1950 |
| 2,591,519 | Decker | Apr. 1, 1952 |
| 2,643,786 | Baker | June 30, 1953 |
| 2,792,884 | Grimal | May 21, 1957 |